United States Patent [19]

Schippers

[11] 3,762,692
[45] Oct. 2, 1973

[54] SCREW EXTRUDER FOR THERMOPLASTIC MELTS WITH TEMPERATURE EQUALIZING HEAD

[75] Inventor: Heinz Schippers, Remscheid, Germany

[73] Assignee: Barmag Barmer Maschinenfabrik Aktiengesellschaft, Wuppert, Germany

[22] Filed: June 22, 1971

[21] Appl. No.: 155,521

[30] Foreign Application Priority Data
June 23, 1970 Germany.................P 20 30 755.5

[52] U.S. Cl............ 259/191, 165/92, 259/DIG. 18
[51] Int. Cl.......... B29b 1/06, B29b 3/00, B01f 7/04
[58] Field of Search................ 259/9, 10, 185, 191, 259/192, 193, DIG. 18; 425/209; 165/87, 92

[56] References Cited
UNITED STATES PATENTS

| | | | |
|---|---|---|---|
| 3,030,898 | 4/1962 | Freed | 259/185 |
| 3,555,616 | 1/1971 | Parks | 425/209 |
| 2,752,633 | 7/1956 | Weitzel | 259/193 |
| 2,607,077 | 8/1952 | Dulmage | 259/193 |
| 3,045,283 | 7/1962 | Keiser | 259/191 |
| 2,641,800 | 6/1953 | Myers | 165/87 X |
| 3,109,913 | 11/1963 | Galajda, Jr. | 259/DIG. 18 |

*Primary Examiner*—John Petrakes
*Assistant Examiner*—Alan I. Cantor
*Attorney*—Johnston, Root, O'Keeffe, Keil, Thompson & Shurtleff

[57] ABSTRACT

A screw extruder for thermoplastic polymer melts in which the free end of the screw near the discharge outlet in the barrel housing of the extruder is equipped with a slotted head member to provide a large number of circumferentially distributed ribs with a radial extension or corresponding depth of the slots which is sufficient to achieve a substantial improvement in the temperature equalization of the extruded polymer melt.

6 Claims, 8 Drawing Figures

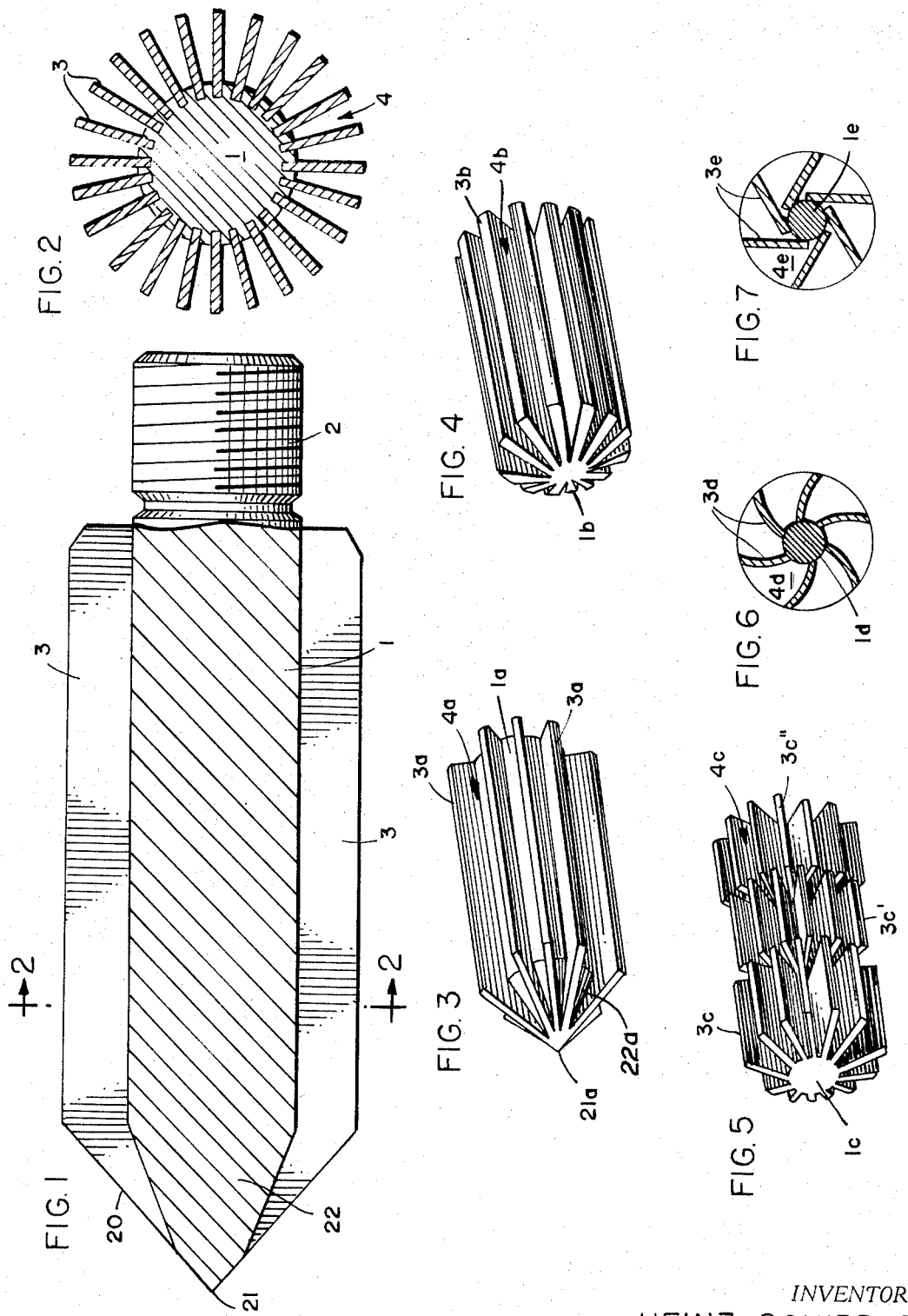

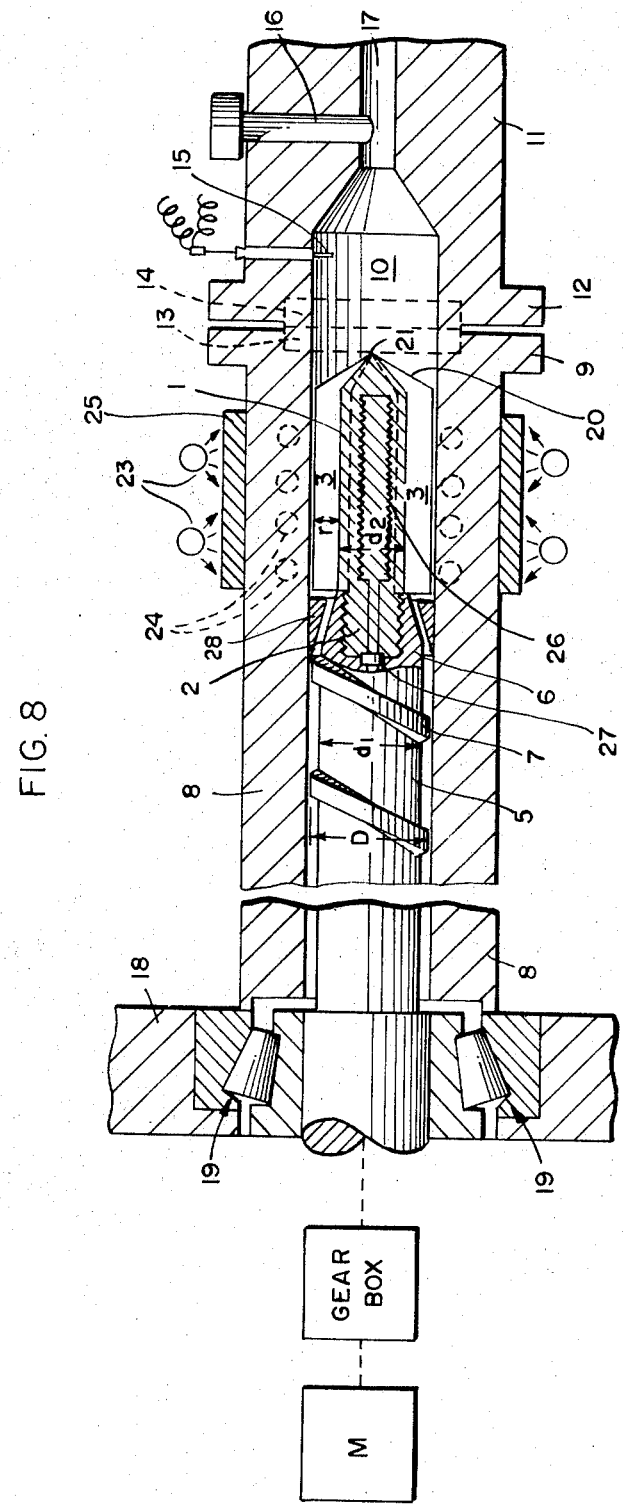

SCREW EXTRUDER FOR THERMOPLASTIC MELTS WITH TEMPERATURE EQUALIZING HEAD

Extrusion devices with a rotatable screw or worm in a cylindrical housing are commonly employed for the continuous processing and production of thermoplastic polymers or similar synthetic resin molding compositions. Devices of this type are known in which the free end of the screw exhibits a number of elongated ridges, ribs or lands. Such ribs or lands are also provided on the inner wall of the housing at the free end of the screw or simultaneously on both the screw end and the inner wall of the housing. These ribs or lands can be placed in axially parallel positions or at an angle to the axis of the screw or in various alternating or random positions.

In the prior art devices, a practical use of these elongated ribs or lands required that they be of very compact form and also that they be arranged around the circumference of the root or core of the screw so as to be distributed in proportionately wide intervals. Such an arrangement provides for changes in the direction of flow of the polymer mass in terms of a physical mixing of the molten polymer and also provides for the production of some additional shear forces. Also, in the known constructions, the annular gap between the inner wall of the housing and the outer surface of the free screw end is interrupted by only a very few ribs or lands. This permits the greatest possible flow cross-section between the individual ribs, i.e., so as to provide annularly segmented zones with proportionately large curved lengths for the melt flow. The molten polymer material between the outer exposed surfaces of the ribs or lands, i.e., their peripheral surfaces, and the oppositely located surfaces of the housing undergoes relatively large shear forces as the molten material flows from one annularly segmented space into the next adjacent segmented space in the direction of turning, the sheared material then mixing with the melt of the next segment before being subjected to further shear forces.

It is also known that one can provide a spiral profile on the cylindrical surface of a coaxially elongated portion of the free screw end. This conventional embodiment is sometimes referred to as a grooved head, since it is usually constructed by grooving a head member which extends at the screw end from the threaded portion of the screw. By means of this profiling or grooving of the screw head, a number of flat circumferentially distributed and arranged chambers are formed between the resulting grooved lands. The groove lands themselves are of compact form. The depth of the resulting chambers is substantially less than the depth of the last screw threads immediately preceding the screw head at the free end of the screw. THus, with this construction, the peripheral surface of the grooved head forms a very narrow flow gap with the inner surface of the opposing wall of the barrel housing. By means of this grooved head, the thermoplastic polymer initially treated in the screw extruder is compressed into a film whose thickness is much less than that provided by the preceding screw threaded depth. The very slight flow gap of the grooved head produces a very high shearing effect on the one hand, and since the melt continuously flows over the grooved and landed head from one chamber to the next, a relatively favorable mixing and homogenization is achieved on the other hand.

In addition to the above described embodiments for the head or free end of a screw in a continuously operated screw extruder, it is also known that the front face of the screw end which faces the discharge opening can be provided with spirally positioned ribs. This permits the thermoplastic polymer melt to be radially deflected after it has left the final screw thread. Such a construction is intended to change the direction of flow so as to avoid any dead space immediately before the nozzle plate or die of the extruder, the melt then being divided equally among all of the nozzle openings which serve for extrusion molding of the melt as it is discharged.

In all of these known embodiments at the free end of the worm or screw, it will be apparent that some moderation or equalization of the temperature occurs as a result of the more or less intensively occurring mixing and homogenizing of the melt flowing around or over the provided ribs and lands. However, this temperature equalization is far from being sufficient where one wishes to achieve both a high discharge output and also a certain desired temperature maintained at a controlled value just before the discharge opening while at the same time achieving a very thorough equalization of the temperature over the entire cross-section of the discharge opening. For example, the temperature difference between that portion of the melt close to a heated core and the outer circumferential melt is usually quite large and cannot be moderated or reduced to desired minimum values merely by using the known embodiments of a screw head which are essentially only mixing devices at the free end of a threaded screw. In fact, where high shearing forces are produced by this screw head, it is generally found that temperature differences are substantially increased rather than being moderated or equalized.

It is a particular object of the present invention to provide an improved means for equalizing the temperature of a thermoplastic polymer melt as it is discharged from the free end of the screw or worm in a conventional barrel housing. Another object of the invention is to provide a special device in the form of a screw head at the free end of an extruder screw whereby a much more uniform temperature is achieved in the polymer melt being discharged while still separating the melt into a number of individual streams or flow paths. Still another object of the invention is to provide a temperature equalizing device at the free end of an extruder screw in such a manner that the device itself can be easily formed on the screw core or attached directly thereto and which can be easily cleaned or otherwise maintained. It is also an object of the invention to provide such a temperature equalizing device which is easily installed and does not interfere with the normal processing of a polymer melt, particularly at high discharge rates. These and other objects and advantages of the invention will become more apparent upon consideration of the following detailed specification.

It has now been found, in accordance with the present invention, that such objects can be achieved in a generally conventional screw extruder for the continuous processing of a synthetic thermoplastic polymer melt having an elongated rotatable screw mounted within a barrel housing with the free end of the screw near the discharge outlet of the extruder, by providing a special temperature equalizing device which is in the form of a head member located at the free end of the screw so as to receive melt from the last screw thread in the direction of extrusion, this head member having a large number of circumferentially distributed ribs separated by a correspondingly large number of slots or inwardly recessed channels, the depth of each of these slots or channels amounting to at least 0.2 times the screw diameter. These ribs, which essentially project radially from the circumference of the screw head, are preferably constructed and arranged so as to extend longitudinally and in substantially parallel relationship to the screw axis of rotation. In another preferred embodiment, the ribs are positioned to define spiral paths on the head member.

This temperature equalizing head member, as employed in combination with other conventional elements of a screw extruder, is disclosed in connection with a number of preferred embodiments as illustrated in the accompanying drawings wherein:

FIG. 1 is a partial sectional view of one preferred radially ribbed screw head adapted to be fitted onto the end of a conventional single flighted extruder screw;

FIG. 2 is a transverse cross-section taken on line 2—2 of FIG. 1;

FIGS. 3, 4 and 5 are partly schematic perspective views of a number of different designs for the temperature equalizing head member;

FIGS. 6 and 7 are transverse cross-sectional views of still other modified embodiments of the temperature equalizing head member; and FIG. 8 is a partly schematic and partly sectional view of selected segments of the entire screw extruder equipped with the temperature equalizing head member of the invention.

Referring first to FIGS. 1, 2 and 8, it is possible to provide the free end of an extrusion screw as the threadless root or core of the extrusion screw itself or more preferably as a separate head member 1 which is then connected to the root or core of the rotatable screw by means of a threaded section 2 or any equivalent fastening means. A large number of radially projecting and elongated ribs 3 are spaced closely together around the circumference of the detachable head member 1 so as to enclose or define a correspondingly large number of slots or longitudinal channels 4 which extend axially over substantially the entire length of the head member 1. Individual ribs 3 in the form of thin plates are constructed of any suitable heat-conducting metal or other head-conducting material, and these plates can be inserted and rigidly attached to the body or core of the head member 1 which is preferably made of steel or another structural metal or alloy. This fastening of the rib 3 to the body 1 is clearly indicated in FIG. 2, and suitable grooves can be machined in the body 1 to receive the ribs 3 which can be welded or shrink-fitted in place. On the other hand, the ribs 3 may also be formed by cutting or machining the slots or channels out of a single headpiece or head member 1.

Various different types of temperature equalizing head members can be constructed and then removably fastened by means of the threaded stub 2 into a correspondingly threaded recess at the free end of a conventional extruder screw 5 as shown in FIG. 8. It will be noted that the diameter of the body 1 of the head member is substantially smaller than the diameter of the root or core 6 of the screw 5, thereby providing a very substantial depth of the slots or channels 4 formed by the ribs 3. At the same time, it is preferable for these ribs to extend radially outwardly to approximately the same diameter of the threded screw 5, this screw diameter being represented by the letter D. The radial extension r of the ribs 3 or their corresponding enclosed slots or channels 4 must then amount to at least about one-fifth of the screw diameter D. These dimensions are particularly critical in achieving the desired temperature equalization effect.

The screw head 7 in the metering or discharge section of the extruder usually provides a relatively shallow thread channel or helical path for the flow of the molten polymer. The gap between these threads 7 and the inner wall of the barrel housing 8 is also conventionally selected so as to prevent any substantial back flow of the molten material. At the same time, the radially projecting ribs, plates or lands 3 on the head member 1 of the present invention are also preferably arranged at this same gap distance from the inner wall of the housing 8 so that very little if any radial backflow occurs around the periphery of this head member.

The head member 1 can be mounted in the extruder directly adjacent to a nozzle plate or extrusion die (not shown) attached onto the end flange 9 of the housing 8, or it is also possible to employ this head member 1 directly adjacent a discharge section 10 of a conventional barrel extension 11 by means of the suitably bolted flange 12. This discharge zone can also be equipped with the usual filter screen or screenblock 13 and/or a so-called breaker plate 14, although it is an advantage of the invention that such elements can frequently be omitted. The discharge section 10 can then be relatively short so as to lead directly into a nozzle plate or extrusion die (not shown). A thermocouple 15 can be positioned at one or more points within the discharge section 10, preferably closely adjacent to the special head member 1 for purposes of measuring the temperature differential across the entire discharge cross-section. Other conventional elements may also be employed such as the pressure control valve 16 in the constricted discharge conduit 17.

The screw 5 of the extruder is rotatably mounted and driven in a conventional manner as indicated by the machine frame 18 carrying suitable bearing members 19, positive rotation of the screw being applied by motor M through the schematically shown gear box.

The exact design of the temperature equalizing head member of the invention can be varied in a number of different ways as indicated by the preferred embodiments illustrated in all of FIGS. 1–7. In all instances, the forward or leading edges 20 of the individual ribs 3 are preferably tapered out to a common point or apex 21 while the body or core 1 of the head member has a similar tapered or conical section 22. While th free radial extension of the individual ribs 3 amounts to at least 0.2 D, it is also very desirable to provide an overall length of the ribs 3 and their corresponding slots in a range of approximately 1.5 to 2.5 D, wherein the letter D represents the screw diameter.

Because of the very large number of ribs and corresponding slots or elongated channels provided on the special head member, the outer surface of the end of the screw is not only increased a considerable number of times over conventional ends or terminal portions of extrusion screws, but there are also provided a very large number of long, deep and narrow chambers between the adjacent walls of the ribs. It will be noted that the circumferential surface of the head member 1 is decreased only slightly by reason of a smaller diameter but even more by the placement of the ribs along the circumferential surface. On the other hand, the radially projecting surfaces of the ribs 3 which form the channel walls provide an increased surface area which is many times over that of the heads of known screws. This large increase in surface area can be readily calculated from the fact that the radial extension is at least 0.2 D.

With all of the illustrated embodiments, the flowing melt is thus brought into contact with a proportionately large contact surface on the head member or free end of the screw, and at the same time, the melt becomes redistributed into layers or individual partial streams flowing within the channels with greater radial flow, thereby causing a constant exchange of melt between the inner core layers and outer edge layers. In other words, the melt flowing along the core and along the outer edges of the extruder in the terminal threaded portion of the screw tend to blend together through the mixing function of the head member of the invention, primarily as a result of the rearrangement in the direction of melt flow. In this respect, the head member of the invention acts as a multi-ribbed circulating element. In this respect, it is preferable if the circular or rotational movement imparted by the rotating ribs 3 is at least equal to or greater than the longitudinal movement or axial movement which is still exerted on the melt by the previous conveying movement of the threads 7 on the screw extruder 5.

As shown in FIG. 3, the individual ribs 3a can be further arranged such that they extend axially beyond the head or apex formed by the conical portion 22a of the body portion 1a. In this instance, the ribs 3a are preferably inserted and rigidly attached to the carrier body 1a so as to provide a cross-section similar to that shown in FIG. 2.

FIG. 4 illustrates an embodiment in which the individual slots or channels 4b are carefully machined or worked out of an integral cylindrical head member or screw core 1b such that the remaining projections, ribs or lands 3b are quite similar to the ribs 3 or 2a of the preceding embodiments.

FIG. 5 illustrates still another modified embodiment in which a large number of radially projecting and circumferentially distributed ribs 3c are arranged into three axially adjacent zones of ribs 3c, 3c' and 3c'' with the ribs in each zone being offset from those of the adjacent zone or zones by a selected angle of rotation. For example, the ribs 3c and 3c'' of the first and last zones can be aligned with each other while the intermediate ribs 3c' in the intermediate zone can be offset halfway between the aligned ribs, i.e., by a slight angle of rotation corresponding to half of the angle formed by two adjacent ribs in the same zone. A head member formed in this manner acts such that the partial melt stream flowing in the slot or channel 4c between the ribs of one zone is then divided into separate axially flowing streams by the radially projecting ribs in the next zone in the direction of extrusion. Also, this use of a plurality of axially positioned and offset rib groups has the advantageous effect that the layer of melt along the inner surface of the barrel housing wall is more effectively broken up by the offset positions of the successive ribs 3c, 3c' and 3c— or an even larger number of groups of such ribs.

In all of the preceding embodiments shown in the drawing, all of the individual ribs 3 are straight thin plates or slightly tapered radial projections which are arranged parallel to the axis of the screw. However, rather than being arranged in this longitudinal or straight manner, they can also be spirally shaped as shown in the modified embodiment of FIG. 6. In this instance, there are provided a large number of blade-shaped ribs 3d which form individual segments of a spiral rather than extending linearly outwardly along a radius of the head member.

Another similar modification is indicated in FIG. 7, wherein either curvelinear or straight ribs 3e can be arranged tangentially attached to the body or screw core 1e. In both of the embodiments of FIGS. 6 and 7, whether the ribs are shaped in a curvelinear manner or in a straight manner but with their elongated surfaces at one or more angles tangential to the screw core, still another influence is exerted on the melt stream. Thus, this construction causes the melt to be transported more radially outwardly from the core or inner region of the head member 1d or 1e.

It must be emphasized that FIGS. 3–7 are schematic or diagrammatic illustrations only, since only a few number of ribs or slots have been illustrated at relatively large intervals around the body or core of the head member. Actually, many more ribs and slots must be provided to achieve satisfactory results, but these large numbers of ribs are difficult to illustrate without losing considerable definition and understanding of the desired structure. Accordingly, reference should be made to FIGS. 1, 2 and 8 in terms of the minimum number of ribs which are normally required in the head member constructed in accordance with the invention. For example, one should preferably employ at least about 20 ribs around the circumference of the core or root of the head member, and certainly never less than about 10 ribs.

In order to regulate the temperature of the melt as it is conveyed through the screw extruder, it is common to employ many different types of heating and/or cooling elements either along or within the barrel housing or else internally of the root or core of the screw itself. Such heating and/or cooling elements can also be provided in combination with the temperature equalizing head member of the invention, for example as generally shown by FIG. 8 around or within the head member 1. For example, cooling air 2 can be blown from suitable sources around the exterior of the housing 8 or thorugh an annular chamber around this housing, or else tubular conduits indicated at 24, usually a single spiral tubular conduit, can be used to circulate a suitable cooling or heating liquid through the housing 8. It is most common, however, to provide electrical heating systems for screw extruders, for example by means of a resistance heater 25 wrapped in the form of a band around the barrel housing 8. Indication heating can also be employed in order to heat the barrel wall 8, and this is particularly useful around the head member of the invention in providing a uniform heat as well as permitting a rapid cooling when required. In one embodiment of the invention, it is especially preferred to employ an electrical resistance heating element 26 or cooling means which can be incorporated within the head member 1 so as to provide a supply of heat or cooler directly to the ribs 3. This can be easily accomplished by means of lead wires connected in a suitable socket means 27 with the electrical lines then extending backwardly through the core or shaft of the extruder. Other similar arrangements will be readily apparent to those skilled in this art.

According to a further preferred embodiment of the invention, there is additionally provided a retention or baffle means as the polymer melt leaves the last screw thread and flows into the temperature equalizing head. With such a retention means the melt is forced at first to flow more in the direction of the screw axis before it reaches the elongated ribs of the head member. In this manner, a forced redistribution of the heated core melt layers with the peripheral melt layers is more easily accomplished. As retention or baffle means, many structural variations are possible including, for example, an enlarged diameter of a conical root or core of the screw. This enlargement can also be provided in the form of a collar or peripheral bead attached to the screw shaft adjacent to and preferably running smoothly from the last screw thread. Such baffles in the form of shrunk on rings or shaft collars are common in this art.

On the other hand, as indicated in FIG. 8, the baffle or retention means can also be formed by a suitable concentric ring 28 connected rigidly with the stationary screw housing 8 at the very end of the threaded screw shaft or core 5. Also, this ring 28 can be tapered inwardly in the direction of melt flow with a similar conical taper provided on the end portion 6 of the screw shaft. A retention effect is produced by the fact that the annular gap between the ring 28 and the concentrically enclosed shaft end 6 is smaller than the normal annular gap represented by the depth of the screw thread.

The construction of the retention means should also be accomplished according to conventional design principles in this art so as to avoid dead spaces which might seriously affect the polymer melt. Also, the design of this retention or baffle means depends partly on whether there is a heated core and/or a cooled housing or just the reverse. In either case, however, it is desirable to direct the melt layers closest to the heating source radially toward the position of the cooler layers or th cooling source in that portion of the housing around the head member of the invention. Furthermore, the design of the elongated ribs can also be adapted to favor a continuation of this mixing or interchanging of melt layers as between the inner core and the outer periphery.

An optimum temperature regulation along the head member of the invention can best be achieved by providing means to directly heat or coll the elongated ribs 3, for example, using the electrical resistance heating means 26 as indicated in FIG. 8. Cooling elements are more easily incorporated in or around the barrel housing 8, but these are also sometimes incorporated in the screw shaft. The thermocouple 15 or similar heat sensitive elements can be used in a conventional manner together with the resistance heater, e.g., with an adjustable control device, to provide temperature regulating means for the individual ribs 3.

The screw head member of the invention not only promotes a uniform mixing of the polymer melt, but most importantly, causes the temperature of the melt to become very uniform over the entire flow path as a result of heat exchange between the relatively thin ribs or elongated projections forming slot or channel walls at a large number of circumferentially spaced points or locations. In general, it is desirable to provide ribs whose thickness is not greater than about 1/20 D and preferably with a thickness smaller than 1/40 D. There is then a particularly good temperature equalization between a heated core melt and a cooler peripheral melt by the time the polymer is discharged from the head member.

As a specific example of the invention, substantially as shown in FIGS. 1 and 2, a mixing and temperature equalizing head was constructed with 24 axially parallel ribs distributed or spaced equally around the circumference of the body or core. These ribs had a length of 2 D and a free height or radial extension beyond the core of about 1/5 D, the thickness of each plate being uniform throughout and amounting to 1/60 D (wherein D represents the screw diameter which amounted to 59.9 mm ). The individual ribs were also tapered or sloped at their forward end approximately as shown. With a final screw core or root diameter $d_1$ of 50.0 mm, the body or core of the ribbed head member had a smaller diameter $d_2$ of 30.0 mm .

In operating an otherwise conventional screw extruder with this special temperature equalizing head, processing a variety of thermoplastic polymers including nylons such as polycaprolactam and polyhexamethylene adipate, it was possible to measure temperatures over the entire cross-section of the melt being discharged from the head member. In all cases, the reduction in the temperature differential ($\Delta T$) between the core melt and the peripheral melt was 50 percent greater than that achieved with known screw heads of the more conventional mixing or shearing type.

The new head member or terminally ribbed screw head of the invention thus provides a substantial improvement and superior results in terms of a much more favorable temperature equalization of the polymer melt. Moreover, it is reasonably simple and economical to produce as well as being easily installed or removed from the barrel housing of the screw extruder. Finally, it can be readily easily incorporated within or adapted for use in existing extruders, requiring only minor modifications in overall structure.

I claim:

1. In a screw extruder for the continuous processing of a synthetic thermoplastic polymer melt having an elongated rotatable screw mounted within a barrel housing with the free end of the screw near the discharge outlet of the extruder, the improvement for equalization of the temperature of the extruder polymer melt which comprises a head member located at the free end of the screw and adapted to receive melt from the last screw thread in the direction of extrusion, said head member having a large number of circumferentially distributed ribs separated by a correspondingly large number of slots, the depth of each of said slots amounting to at least 0.2 D whereas the ribs have a length of about 1.5 to 2.5 D and a thickness of not more than 1/40 D, wherein D represents the outer screw thread diameter.

2. A screw extruder as claimed in claim 1 wherein said ribs are positioned to define spiral paths on said head member.

3. A screw extruder as claimed in claim 1 wherein the individual ribs are blade-shaped with at least a portion of their radial extension arranged tangentially to a cylindrical supporting core of the screw head.

4. A screw extruder as claimed in claim 1 wherein there are a plurality of groups of said circumferentially distributed ribs, said groups being displaced at an angle of rotation as between the ribs of two adjacent groups.

5. In a screw extruder for the continuous processing of a synthetic thermoplastic polymer melt having an elongated rotatable screw mounted within a barrel housing with the free end of the screw near the discharge outlet of the extruder, the improvmeent for equalization of the temperature of the extruded polymer melt which comprises a head member located at the free end of the screw and adapted to receive melt from the last screw thread in the direction of extrusion, said head member having a large number of circumferentially distributed ribs which extend at least partly beyond the tip of the screw core supporting said ribs and which are separated by a correspondingly large number of slots, the depth of each of said slots amounting to at least 0.2 D wherein D represents the outer screw thread diameter.

6. A screw extruder as claimed in claim 5 wherein the ribs have a length of about 1.5 to 2.5 D and a thickness of not more than 1/40 D, wherein D again represents the outer screw thread diameter.

* * * * *

UNITED STATES PATENT OFFICE
CERTIFICATE OF CORRECTION

Patent No. 3,762,692          Dated October 2, 1973

Inventor(s) Heinz Schippers

It is certified that error appears in the above-identified patent and that said Letters Patent are hereby corrected as shown below:

First page, left-hand column, seventh line, "Wuppert" should read -- Wuppertal --.

Column 4, line 54, "th" should read -- the --.

Column 5, line 43, "2a" should read -- 3a --.

Column 5, line 66, "3c-" should read -- 3c --.

Column 5, lines 66-67, "or an even larger number of groups of such ribs." should not be italicized.

Column 6, line 48, "2" should read -- 23 --.

Column 6, line 49, "thorugh" should read -- through --.

Column 6, line 57, "Indication" should read -- Induction --.

Column 7, line 43, "th" should read -- the --.

Column 7, line 51, "coll" should read -- cool --.

Column 8, line 50, "extruder" should read -- extruded --.

Column 9, line 9, "improvmeent" should read -- improvement --.

Signed and sealed this 15th day of October 1974.

(SEAL)
Attest:

McCOY M. GIBSON JR.
Attesting Officer

C. MARSHALL DANN
Commissioner of Patents